United States Patent
Jeong et al.

(10) Patent No.: US 12,449,709 B2
(45) Date of Patent: Oct. 21, 2025

(54) SPATIAL LIGHT MODULATOR AND ELECTRONIC APPARATUS INCLUDING THE SAME

(71) Applicant: SAMSUNG ELECTRONICS CO., LTD., Suwon-si (KR)

(72) Inventors: Byunggil Jeong, Anyang-si (KR); Sunil Kim, Osan-si (KR); Junghyun Park, Seoul (KR); Minkyung Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 576 days.

(21) Appl. No.: 17/830,977

(22) Filed: Jun. 2, 2022

(65) Prior Publication Data
US 2023/0176445 A1 Jun. 8, 2023

(30) Foreign Application Priority Data

Dec. 8, 2021 (KR) .......... 10-2021-0175199

(51) Int. Cl.
*G02F 1/29* (2006.01)

(52) U.S. Cl.
CPC .......... *G02F 1/292* (2013.01); *G02F 2203/24* (2013.01); *G02F 2203/50* (2013.01)

(58) Field of Classification Search
CPC .... G02F 1/0147; G02F 1/292; G02F 2203/25; G02F 2203/50; G02F 1/0102; G02F 1/0305; G02F 1/0311; G02F 1/0372; G02B 26/0808; G02B 5/1861; G02B 5/1828; G01S 7/4811; G01S 17/931; H10N 10/13
See application file for complete search history.

(56) References Cited

U.S. PATENT DOCUMENTS

| 5,079,618 A | 1/1992 | Farnworth |
| 9,523,922 B2 | 12/2016 | Bach et al. |
| 9,711,697 B2 * | 7/2017 | Vassant ............... H10H 20/855 |
| 10,983,371 B2 | 4/2021 | Takizawa et al. |
| 2006/0033980 A1 * | 2/2006 | Wagner .................. G02B 7/181 |
| | | 359/291 |
| 2008/0088906 A1 * | 4/2008 | Wagner ..................... G02F 1/21 |
| | | 359/237 |
| 2009/0303598 A1 * | 12/2009 | Park ........................ G02F 1/292 |
| | | 359/566 |

(Continued)

FOREIGN PATENT DOCUMENTS

| KR | 10-2011-0059800 A | 6/2011 |
| KR | 10-2021-0073703 A | 6/2021 |
| KR | 10-2021-0088047 A | 7/2021 |

OTHER PUBLICATIONS

Communication dated Dec. 5, 2022, issued by the European Patent Office in European Application No. 22178068.7.

(Continued)

*Primary Examiner* — Jessica M Merlin
(74) *Attorney, Agent, or Firm* — Sughrue Mion, PLLC

(57) ABSTRACT

A spatial light modulator and an electronic apparatus including the spatial light modulator are provided. The spatial light modulator may include: a plurality of pixels configured to steer incident light; and a plurality of thermoelectric layers in which heat transfer with the plurality of pixels occurs. The plurality of pixels may include a plurality of grating structures.

23 Claims, 21 Drawing Sheets

(56) References Cited

U.S. PATENT DOCUMENTS

| | | | |
|---|---|---|---|
| 2011/0259385 A1* | 10/2011 | Hiroyama | H10N 10/17 |
| | | | 136/224 |
| 2018/0196137 A1* | 7/2018 | Lee | G01S 7/481 |
| 2018/0196138 A1* | 7/2018 | Lee | G02F 1/21 |
| 2021/0055626 A1 | 2/2021 | Jeong et al. | |
| 2021/0124235 A1 | 4/2021 | Sickler | |
| 2021/0173239 A1 | 6/2021 | Park et al. | |
| 2021/0208256 A1 | 7/2021 | Kim et al. | |
| 2021/0255468 A1 | 8/2021 | Kim et al. | |

OTHER PUBLICATIONS

Soref et al., "Electro-optic Fabry-Perot pixels for phase-dominant spatial light modulators," Applied Optics, vol. 31, No. 5, pp. 675-680, Feb. 1992, XP000247303.

Wu et al., "Dynamic beam steering with all-dielectric electro-optic III-V multiple-quantum-well metasurfaces," Nature Communication, vol. 10, No. 1, Jan. 2019, XP055725908.

* cited by examiner

SPATIAL LIGHT MODULATOR AND ELECTRONIC APPARATUS INCLUDING THE SAME

CROSS-REFERENCE TO RELATED APPLICATION

This application is based on and claims priority under 35 U.S.C. § 119 to Korean Patent Application No. 10-2021-0175199, filed on Dec. 8, 2021, in the Korean Intellectual Property Office, the disclosure of which is incorporated by reference herein in its entirety.

BACKGROUND

1. Field

Apparatuses and methods consistent with example embodiments relate to a spatial light modulator capable of controlling the output phase of light, and an electronic apparatus including the spatial light modulator.

2. Description of the Related Art

An advanced driving assistance system (ADAS) having various functions has been commercialized. For example, there are an increasing number of vehicles equipped with various functions, such as adaptive cruise control (ACC) for reducing speed when there is a risk of collision and driving the vehicle within a set speed range when there is no risk of collision, by recognizing the position and speed of other vehicles, and an autonomous emergency braking (AEB) system that recognizes a vehicle ahead and prevents a collision by automatically applying braking when there is a risk of collision but the driver does not respond or a response method is inappropriate. Furthermore, it is expected that vehicles capable of autonomous driving will be commercialized in the near future.

Accordingly, interest in optical measurement devices capable of providing information about vehicle's surroundings is growing. For example, a light detection and ranging (LiDAR) apparatus for vehicles may provide information on a distance, a relative speed, an azimuth angle, etc. with respect to an object in the vicinity of a vehicle by emitting a laser to a selected region in the vicinity of the vehicle and detecting the reflected laser. To this end, a LiDAR apparatus for vehicles needs a beam steering technology that enables steering of light to a desired region.

Beam steering methods may largely include mechanical methods and non-mechanical methods. For example, mechanical beam steering methods may include a method of rotating a light source itself, a method of rotating a mirror that reflects light, a method of moving a spherical lens in a direction perpendicular to the optical axis, etc. Furthermore, non-mechanical beam steering methods may include a method using a semiconductor device and a method of electrically controlling the angle of reflected light by using a reflective phase array.

SUMMARY

One or more example embodiments provide a spatial light modulator with high reliability, and an electronic apparatus including the spatial light modulator.

According to an aspect of the disclosure, a spatial light modulator may include: a first reflective layer and a second reflective layer; a cavity layer provided between the first reflective layer and the second reflective layer, the second reflective layer including grating structures of a first group and grating structures of a second group which are independently driven, and are immediately adjacent to each other; and a thermoelectric layer configured to cause heat transfer to occur between the thermoelectric layer and the second reflective layer, wherein the thermoelectric layer may include a first thermoelectric layer and a second thermoelectric layer to which different electrical signals are applied, wherein the first thermoelectric layer corresponds to the grating structures of the first group, and the second thermoelectric layer corresponds to the grating structures of the second group.

The first reflective layer and the cavity layer may be provided between the second reflective layer and the thermoelectric layer.

The grating structures of the first group may be disposed directly above the first thermoelectric layer in a thickness direction of the spatial light modulator, and the grating structures of the second group may be disposed directly above the second thermoelectric layer in the thickness direction of the spatial light modulator.

When an off signal is applied to the grating structures of the first group, a first electrical signal that causes heat transfer from the grating structures of the first group to the first thermoelectric layer, may be applied to the first thermoelectric layer.

When an on signal is applied to the grating structures of the first group, a second electrical signal that causes heat transfer from the first thermoelectric layer to the grating structures of the first group, may be applied to the first thermoelectric layer.

Polarities of the first electrical signal and the second electrical signal may be different from each other.

When an on signal is applied to the grating structures of the first group, an electrical signal may not be applied to the first thermoelectric layer.

When an on signal is applied to the grating structures of the first group and an off signal is applied to the grating structures of the second group, a third electrical signal that causes a heat movement from the grating structures of the second group to the second thermoelectric layer may be applied to the second thermoelectric layer.

No electrical signal may be applied to the first thermoelectric layer.

A fourth electrical signal having a polarity different from that of the third electrical signal may be applied to the first thermoelectric layer.

The second reflective layer may further include grating structures of a third group that is disposed immediately adjacent to the grating structures of the second group and spaced apart from the grating structures of the first group, the thermoelectric layer may further include a third thermoelectric layer corresponding to the grating structures of the second group, and when the off signal is applied to the grating structures of the third group, a fourth electrical signal having the same polarity as that of the third electrical signal may be applied to the third thermoelectric layer, or an electrical signal may not be applied to the third thermoelectric layer.

Before a driving signal is applied to the spatial light modulator, a signal for a heat movement from the second reflective layer to the thermoelectric layer may be applied to the entire thermoelectric layer.

The thermoelectric layer may cause a heat transfer to occur by a Peltier effect.

The thermoelectric layer may include a plurality of n-type semiconductor layers and a plurality of p-type semiconductor layers alternately arranged; and an electrode configured to electrically connect the plurality of n-type semiconductor layers and the plurality of p-type semiconductor layers in series.

The spatial light modulator may further include an insulating layer disposed between the first reflective layer and the thermoelectric layer.

At least one of the grating structures may include any one of a PIN structure, a NIN structure, and a PIP structure.

Pitches of the grating structures may be less than a wavelength of light modulated by the spatial light modulator.

The first reflective layer may be a distributed Bragg reflective layer.

According to an aspect of the disclosure, an electronic apparatus includes a spatial light modulator including a plurality of pixels configured to steer incident light and a plurality of thermoelectric layers configured to control a heat movement between the plurality of pixels according to a control signal; and a processor configured to provide the control signal controlling a movement of heat generated in the plurality of pixels to the plurality of thermoelectric layers while providing a driving signal steering the incident light to the plurality of pixels.

The plurality of pixels may include: a first reflective layer and a second reflective layer; and a cavity layer provided between the first reflective layer and the second reflective layer. The second reflective layer may include grating structures of a first group and grating structures of a second group, which are independently derive and are immediately adjacent to each other. The plurality of thermoelectric layers may include a first thermoelectric layer and a second thermoelectric layer, to which different electrical signals are applied, the first thermoelectric layer corresponding to the grating structures of the first group and the second thermoelectric layer corresponding to the grating structures of the second group.

The processor may be further configured to, when applying an on signal to the grating structures of the first group and an off signal to the grating structures of the second group, apply, to the second thermoelectric layer, a third electrical signal that causes heat transfer from the grating structures of the second group to the second thermoelectric layer.

The processor may be further configured to apply no electrical signal to the first thermoelectric layer.

The processor may be further configured to apply an electrical signal for a heat movement from the first thermoelectric layer in a direction of the grating structures of the first group to the first thermoelectric layer.

According to another aspect of the present disclosure, an electronic device for detecting an object, may include: a spatial light modulator including a plurality of pixels; and a processor configured to: generate a control signal based on a pre-stored phase profile, to cause the spatial light modulator to release heat according to the control signal; and detect the object based on an optical signal that is modulated by the spatial light modulator, wherein the plurality of pixels may include a plurality of groups of grating structures and a plurality of thermoelectric layers, respectively, and wherein the plurality of thermoelectric layers may be spaced apart from each other and are aligned with the plurality of groups of grating structures in a light incident direction of the spatial light modulator, respectively, and may include n-type semiconductor layers and p-type semiconductor layers that are alternately arranged, in a direction perpendicular to the light incident direction of the spatial light modulator.

BRIEF DESCRIPTION OF THE DRAWINGS

The above and/or other aspects will be more apparent by describing certain example embodiments, with reference to the accompanying drawings, in which.

DETAILED DESCRIPTION

Figure 1:
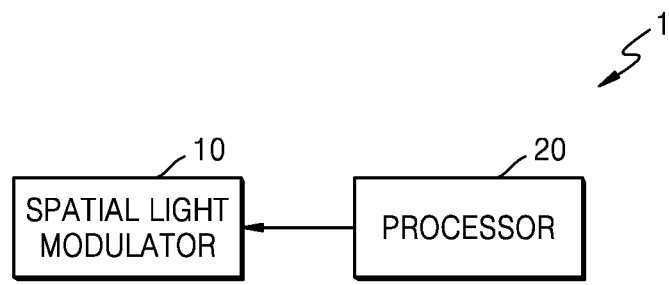
FIG. 1 is a block diagram illustrating an electronic apparatus modulating light, according to an example embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

As used herein, the term "and/or" includes any and all combinations of one or more of the associated listed items. Expressions such as "at least one of," when preceding a list of elements, modify the entire list of elements and do not modify the individual elements of the list.

Hereinafter, spatial light modulators and electronic apparatuses including the spatial light modulators according to various embodiments are described in detail with reference to the accompanying drawings. In the accompanying drawings, like reference numerals refer to like elements throughout. The thickness or size of each layer illustrated in the drawings may be exaggerated for convenience of explanation and clarity. Terms such as "first" and "second" are used herein merely to describe a variety of constituent elements, but the constituent elements are not limited by the terms. Such terms are used only for the purpose of distinguishing one constituent element from another constituent element.

An expression used in the singular encompasses the expression of the plural, unless it has a clearly different meaning in the context. It will be further understood that the terms "comprises" and/or "comprising" used herein specify the presence of stated features or components, but do not preclude the presence or addition of one or more other features or components.

Furthermore, the size or thickness of each layer illustrated in the drawings may be exaggerated for convenience of explanation and clarity. Furthermore, when a certain material layer is referred to as being on a substrate or another layer, the material layer may be in direct contact with the substrate or another layer, or a third layer may be therebetween. A material forming each layer in embodiments below is exemplary, and thus other materials may be used therefor.

Furthermore, terms such as "portion," "module," etc. stated in the specification may signify a unit to process at least one function or operation and the unit may be embodied by hardware, software, or a combination of hardware and software.

The particular implementations shown and described herein are illustrative examples of the disclosure and are not intended to otherwise limit the scope of the disclosure in any way. For the sake of brevity, conventional electronics, control systems, software development and other functional aspects of the systems may not be described in detail. Furthermore, the connecting lines, or connectors shown in the various figures presented are intended to represent functional relationships and/or physical or logical couplings between the various elements. It should be noted that many alternative or additional functional relationships, physical connections or logical connections may be present in a practical device.

The use of the term "the" and similar referents in the context of describing the disclosure are to be construed to cover both the singular and the plural.

Also, operations of all methods described herein may be performed in any suitable order unless otherwise indicated herein or otherwise clearly contradicted by context. Furthermore, the use of any and all examples, or language (e.g., "such as") provided herein, is intended merely to better illuminate the disclosure and does not pose a limitation on the scope of the disclosure unless otherwise claimed.

FIG. 1 is a block diagram illustrating an electronic apparatus 1 modulating light according to an example embodiment. As shown in FIG. 1, the electronic apparatus 1 may include a spatial light modulator 10 that modulates an incident light and a processor 20 that controls the spatial light modulator 10.

The spatial light modulator 10 according to an example embodiment may modulate a phase of the incident light to adjust a travel direction of an output light to be directed in a desired direction.

The processor 20 may provide a phase profile to the spatial light modulator 10 to adjust the travel direction of the output light, or may control the spatial light modulator 10 according to the phase profile. Also, the processor 20 may additionally provide a control signal controlling heat generated by the spatial light modulator 10 to the spatial light modulator 10.

Figure 2:
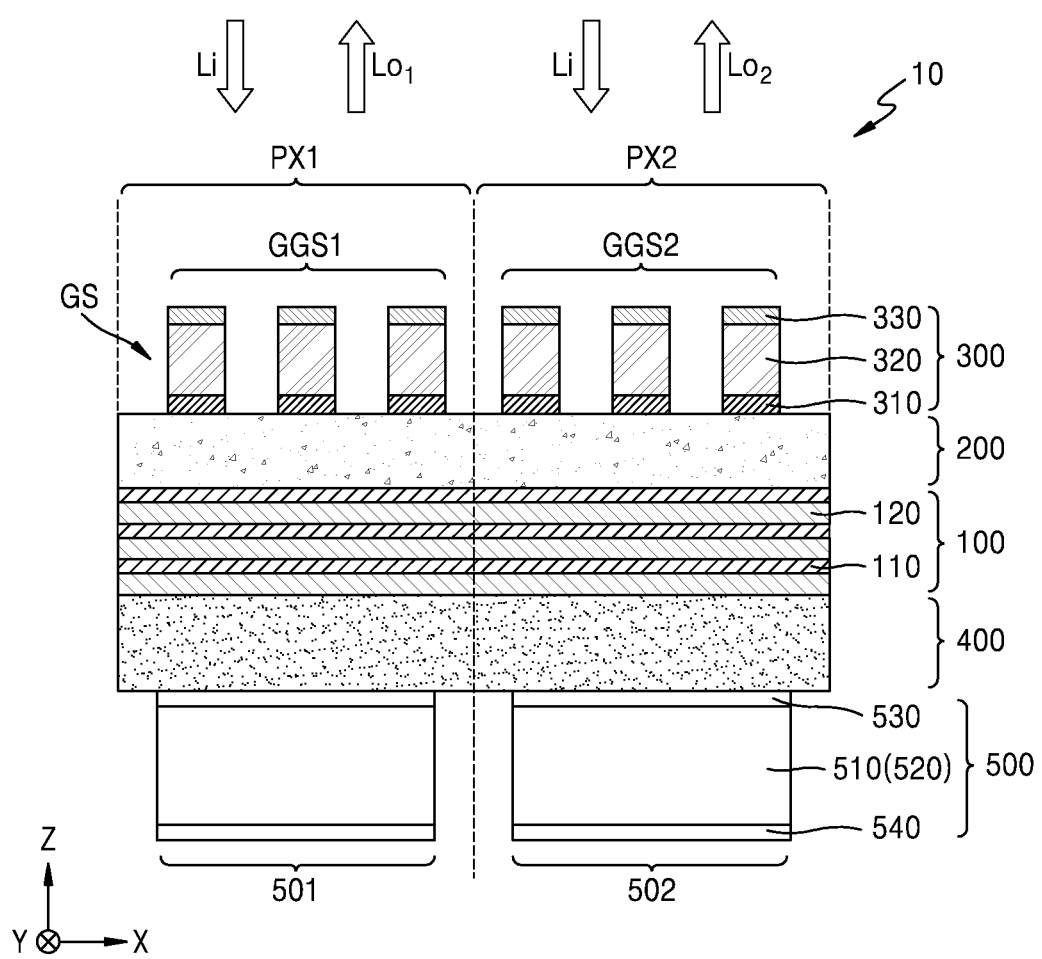
FIG. 2 is a conceptual cross-sectional view of a spatial light modulator according to an example embodiment.

FIG. 2 is a conceptual cross-sectional view of a spatial light modulator 10 according to an example embodiment.

Referring to FIG. 2, the spatial light modulator 10 may include a first reflective layer 100, a cavity layer 200 arranged on the first reflective layer 100, and a second reflective layer 300 arranged on the cavity layer 200.

The spatial light modulator 10 may output light by modulating the phase of incident light Li. The spatial light modulator 10 may include a plurality of pixels. The pixels may include, for example, a first pixel PX1 and a second pixel PX2. A pixel may refer to the smallest unit that is independently driven in the spatial light modulator 10 or a basic unit that independently modulates the phase of light. A pixel may include one or a plurality of grating structures GS forming the second reflective layer 300. FIG. 2 illustrates an example of a structure including two pixels. A pitch between the grating structures GS may be smaller than a wavelength of a modulated light. The length of one side of each of the first and second pixels PX1 and PX2 may be, for example, about 3 μm to about 300 μm.

The spatial light modulator 10 may further include a substrate 400 that supports the first reflective layer 100. The substrate 400 may be formed of an insulating material. For example, the substrate 400 may be a transparent substrate, for example, a silicon substrate or a glass substrate, that transmit light.

The first reflective layer 100 may be a distributed Bragg reflector. For example, the first reflective layer 100 may include a first layer 110 and a second layer 120 having different refractive indexes. The first layer 110 and the second layer 120 may be alternately and repeatedly stacked. Due to a difference in the refractive index between the first layer 110 and the second layer 120, light may be reflected at an interface of each layer and the reflected light may cause interference. The first layer 110 or the second layer 120 may include silicon (Si), silicon nitride ($Si_3N_4$), silicon oxide ($SiO_2$), titanium oxide ($TiO_2$), etc. For example, while the first layer 110 may be formed of silicon, the second layer 120 layer may be formed of $SiO_2$. By adjusting the thickness and/or stack number of the first layer 110 and the second layer 120, the light reflectivity of the first reflective layer 100 may be designed.

The first reflective layer 100 may be a structure other than the distributed Bragg reflector, and may include, for example, a metal reflective layer having one metal surface.

The cavity layer 200 is a region in which the incident light resonates, and may be disposed between the first reflective layer 100 and the second reflective layer 300.

The cavity layer 200 may include, for example, silicon oxide ($SiO_2$). A resonance wavelength may be determined according to the thickness of the cavity layer 200. As the thickness of the cavity layer 200 increases, the resonance wavelength of light may increase, and as the thickness of the cavity layer 200 decreases, the resonance wavelength of light may decrease.

The second reflective layer 300 may be designed to appropriately perform a reflection function of reflecting light of a specific wavelength and a phase modulation function of modulating the phase of output light.

The second reflective layer 300 may include the grating structures GS that are arranged apart from each other at certain intervals. The thickness, width, and pitch of the grating structures GS may be less than the wavelength of light that is modulated by the spatial light modulator 10. The reflectivity of light may be set according to the thickness, width, pitch, etc. of the grating structures GS. The reflectively of the second reflective layer 300 may be different from that of the first reflective layer 100, and the reflectivity of the second reflective layer 300 may be less than that of the first reflective layer 100.

The incident light Li that is incident onto the second reflective layer 300 of the spatial light modulator 10 may be propagated to the cavity layer 200. When the light reaches the first reflective layer 100, the light is reflected from the first reflective layer 100 to the second reflective layer 300, trapped and resonated in the cavity layer 200 by the first reflective layer 100 and the second reflective layer 300, and then output through the second reflective layer 300. Output light $Lo_1$ and $Lo_2$ may have a specific phase, and the phase of the output light $Lo_1$ and $Lo_2$ may be controlled by the refractive index of the second reflective layer 300. The travel direction light may be determined by a relationship of the phase of light output from adjacent pixels. For example, when the phase of the output light $Lo_1$ of the first pixel PX1 and the phase of the output light Lot of the second pixel PX2 are different from each other, the travel direction of light may be determined by the interaction of the output light $Lo_1$ and $Lo_2$.

Figure 3A:
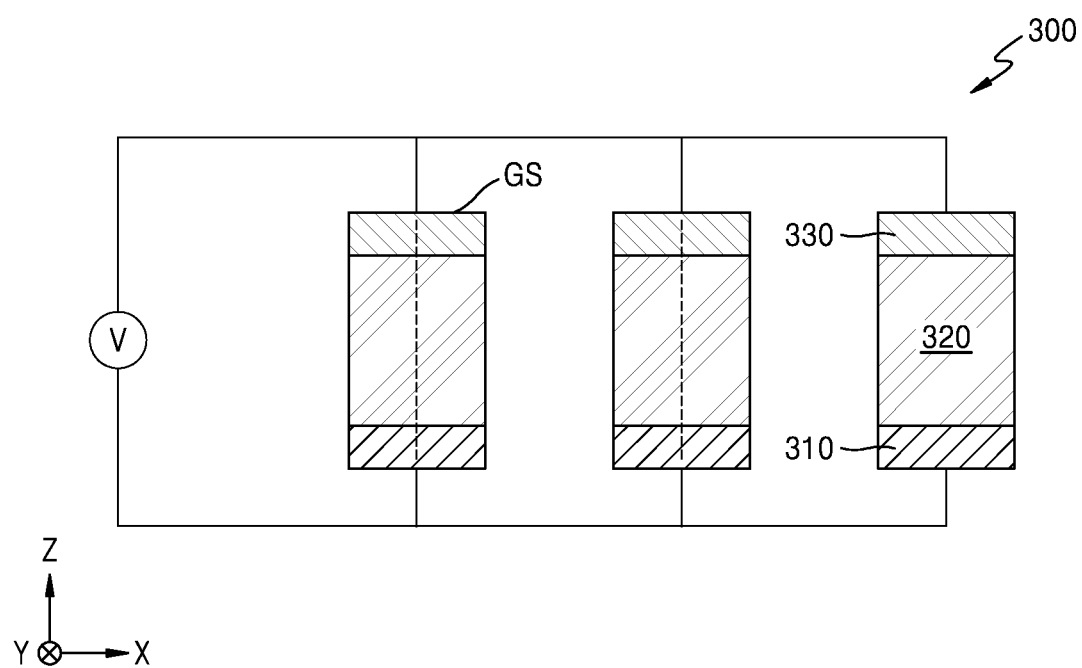
FIG. 3A is a cross-sectional view showing grating structures of a first pixel in FIG. 1.
Figure 3B:
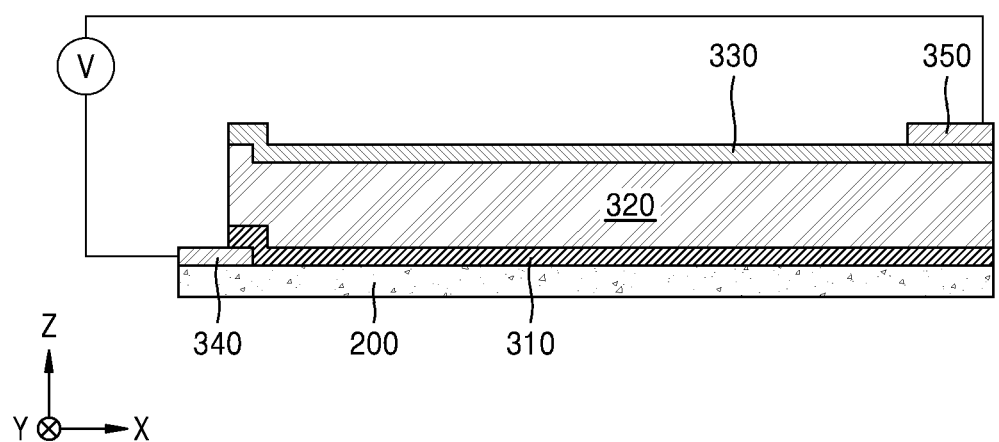
FIG. 3B is a cross-sectional view of the grating structures from another direction.

FIG. 3A is a cross-sectional view showing the grating structures GS of the first pixel PX1 of FIG. 1. FIG. 3B is a cross-sectional view of the grating structures GS from another direction. Referring to FIG. 3A, the grating structures GS may include a first doped semiconductor layer 310, an intrinsic semiconductor layer 320, and a second doped semiconductor layer 330. For example, the first doped semiconductor layer 310 may be an n-type semiconductor layer, the second doped semiconductor layer 330 may be a p-type semiconductor layer, and the grating structures GS may be a PIN diode.

The first doped semiconductor layer 310 may be a silicon layer containing a group 5 element, for example, phosphorus (P) or arsenic (As), as impurities. The concentration of impurities included in the first doped semiconductor layer 310 may be about $10^{15}$ to $10^{21}$ $cm^{-3}$. The intrinsic semiconductor layer 330 may be a silicon layer that does not include impurities. The second doped semiconductor layer 330 may be a silicon layer containing a group 3 element, for example, boron (B), as impurities. The concentration of impurities included in the second doped semiconductor layer 330 may be about $10^{15}$ to $10^{21}$ $cm^{-3}$.

When a voltage is applied between the first doped semiconductor layer 310 and the second doped semiconductor layer 330, a current flows in a direction from the first doped semiconductor layer 310 to the second doped semiconductor layer 330. Heat is generated in the grating structures GS due to the current, and thus the refractive indexes of the grating structures GS may be changed by the heat. When the refractive indexes of the grating structures GS are changed, the phase of light output from the first and second pixels PX1 and PX2 may be changed. Accordingly, the travel direction of the light output from the spatial light modulator 10 may be controlled by adjusting the amount of a voltage V applied to each of the first and second pixels PX1 and PX2.

FIG. 3B is a cross-sectional view of the grating structures GS in another direction (Y direction). Referring to FIG. 3B, the spatial light modulator 10 may include first and second electrodes 340 and 350 to apply a voltage to the grating structures GS. The first electrode 340 may be in contact with one end of the first doped semiconductor layer 310, and the second electrode 350 may be in contact with one end of the second doped semiconductor layer 330. The second electrode 350 may be in contact with an end portion arranged in the Y direction opposite to the end portion that is in contact with the first electrode 340. The first electrode 340 may be arranged on an upper portion of the cavity layer 200, and may be a common electrode that applies a common voltage to all pixels included in the spatial light modulator 10. The second electrode 350 may be a pixel electrode that is configured to apply a different voltage to each pixel.

Although FIGS. 3A and 3B illustrate the grating structures GS in a PIN structure, the disclosure is not limited thereto. The grating structures GS may have an NIN structure or a PIP structure. For example, the first and second doped semiconductor layer 310 and 330 may be n-type semiconductor layers 510 or p-type semiconductor layers 520.

Figure 4:
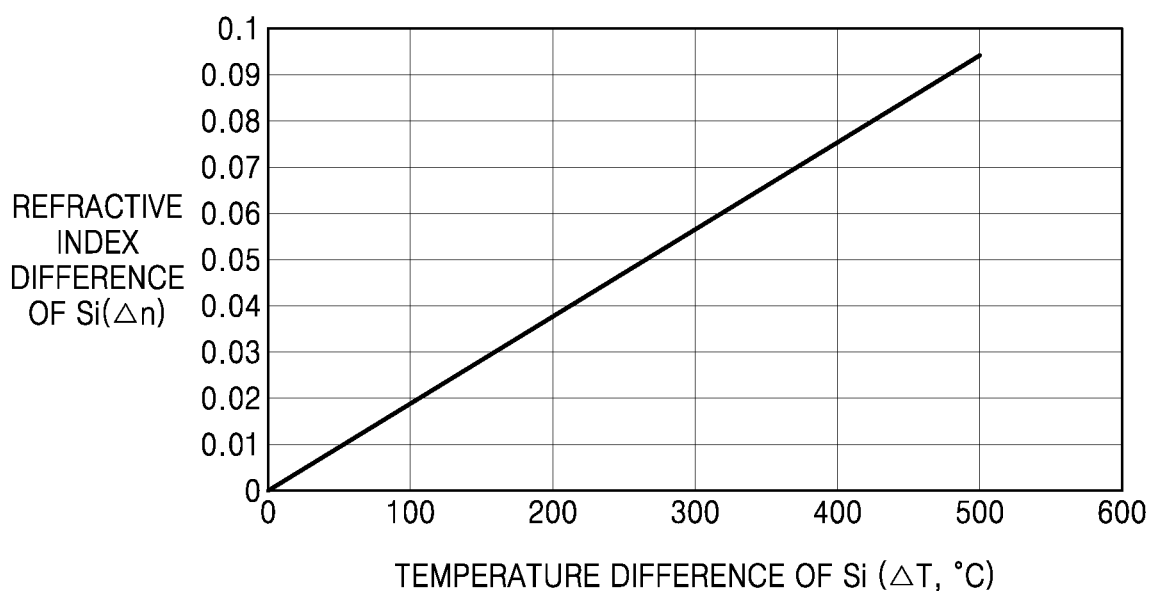
FIG. 4 is a graph showing a relationship between a refractive index and temperature of silicon, according to an example embodiment.

The grating structures GS of the spatial light modulator 10 according to an example embodiment is based on silicon. The refractive index of silicon is proportional to a temperature. FIG. 4 is a graph showing a relationship between a refractive index and temperature of silicon, according to an example embodiment. As illustrated in FIG. 4, as a temperature change of silicon increases, a refractive index change of silicon increases. The refractive index of silicon change is in direct proportion to the temperature change of silicon, and thus, the refractive index change may be easily controlled by controlling the temperature change. Thus, by controlling an electrical signal applied to silicon, the refractive indexes of the grating structures GS may be easily controlled.

The spatial light modulator 10 according to an example embodiment may be driven according to a phase profile provided by the processor 200 to steer light in various directions. The phase profile may be a binary electrical signal to which an on signal or an off signal is applied for each pixel.

Figure 5:
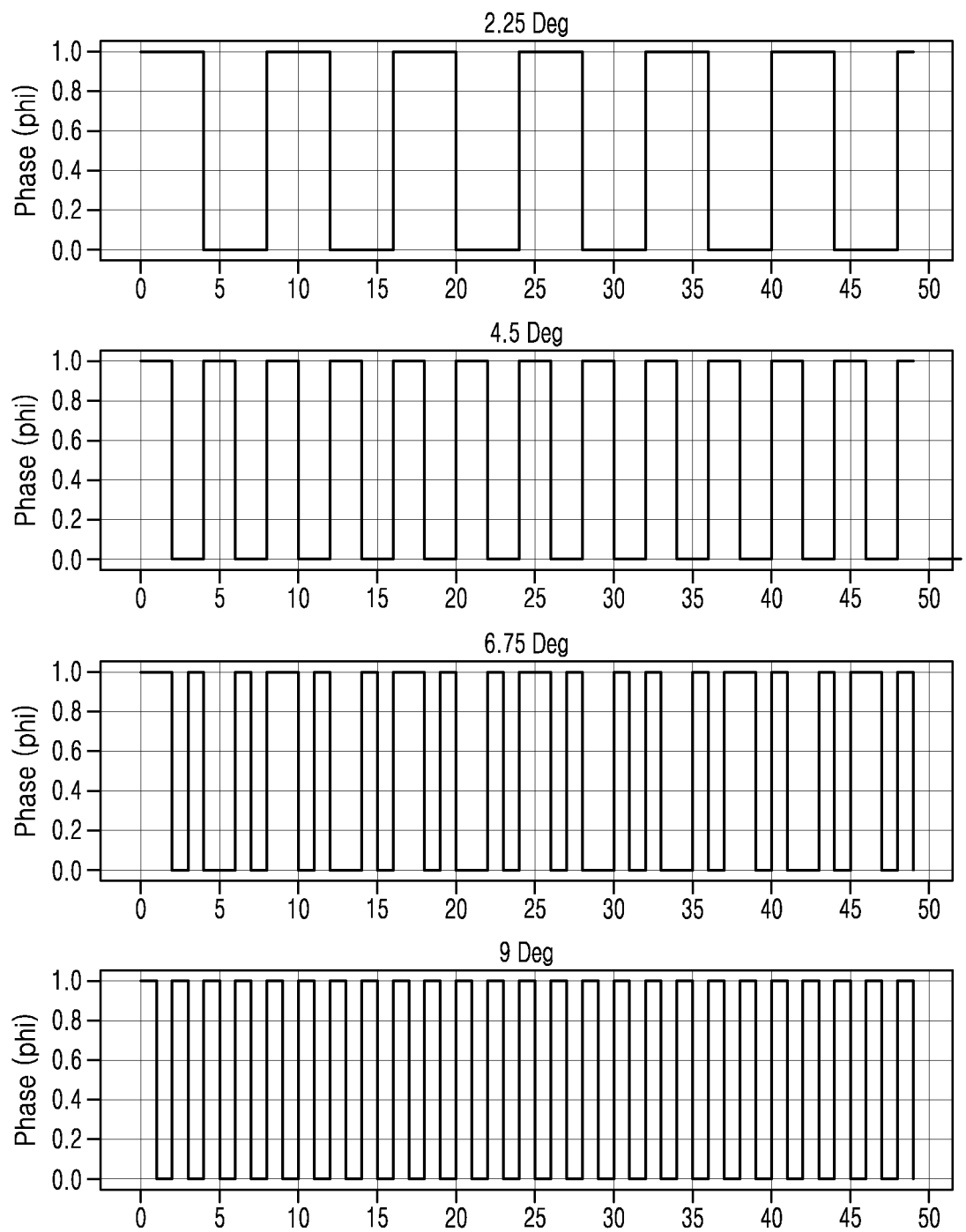
FIG. 5 is a diagram illustrating an example of a phase profile applied to a spatial light modulator according to an example embodiment.

FIG. 5 is a diagram illustrating an example of a phase profile applied to the spatial light modulator 10 according to an example embodiment. As shown in FIG. 5, as an angle steered by the spatial light modulator 10 including 50 pixels increases, a duty cycle of the phase profile may decrease. The processor 20 may provide an on signal or an off signal to each pixel according to a phase profile corresponding to the steering angle.

Meanwhile, an on signal may be applied to any one of neighboring pixels of the spatial light modulator 10 and an off signal may be applied to the other pixel.

Current flows in the grating structures GS included in the pixel to which the on signal is applied (hereinafter referred to as 'on pixel'), and heat is generated in the grating structures GS, and thus a refractive index of the grating structures GS may be changed. Current does not flow in the grating structures GS included in the pixel to which the off signal is applied (hereinafter referred to as an 'off pixel'), and thus the refractive index of the grating structures GS needs not be changed.

However, heat generated in the on pixel may be transferred to the off pixel, and thus the refractive index of the grating structures GS included in the off pixel may also be changed. The heat may be transferred to neighboring pixels through a material connecting the pixels, for example, the first reflective layer 100 and the cavity layer 200. Accordingly, a refractive index of the off pixel may be also changed by the on pixel that abuts onto the off pixel, and thus it may be difficult to stably drive the spatial light modulator 10 without effective heat insulation between pixels.

Accordingly, it is necessary to reduce the transfer of heat generated in units of pixels to other pixels. In addition, it is also necessary to remove heat generated in the spatial light modulator 10 for fast steering of light.

Referring back to FIG. 2, the spatial light modulator 10 according to an example embodiment may further include a thermoelectric layer 500 that is disposed on a lower portion of the first reflective layer 100 and controls heat of pixels. The thermoelectric layer 500 may control heat of pixels by the Peltier effect. The thermoelectric layer 500 may control heat transfer in units of pixels under the control of the processor 20. The thermoelectric layer 500 may be a Peltier module that transfers heat from a heat side (e.g., the first reflective layer 100) to a cold side (e.g., ambient air around the thermoelectric layer 500). The thermoelectric layer 500 may transfer thermal energy rather than absorbing heat.

The thermoelectric layer 500 may be spaced apart from the second reflective layer 300 with the first reflective layer 100 and the cavity layer 200 interposed therebetween. For example, the thermoelectric layer 500 may include a first thermoelectric layer 501 and a second thermoelectric layer 502 to which different electrical signals are applied from the processor 20, wherein the first thermoelectric layer 501 corresponds to a first pixel and the second thermoelectric layer 502 corresponds to a second pixel. The first pixel PX1 and the first thermoelectric layer 501, and the second pixel PX2 and the second thermoelectric layer 502 may be disposed to overlap in a thickness direction (i.e., a z-direction in FIG. 2) of the spatial light modulator 10.

Figure 6:
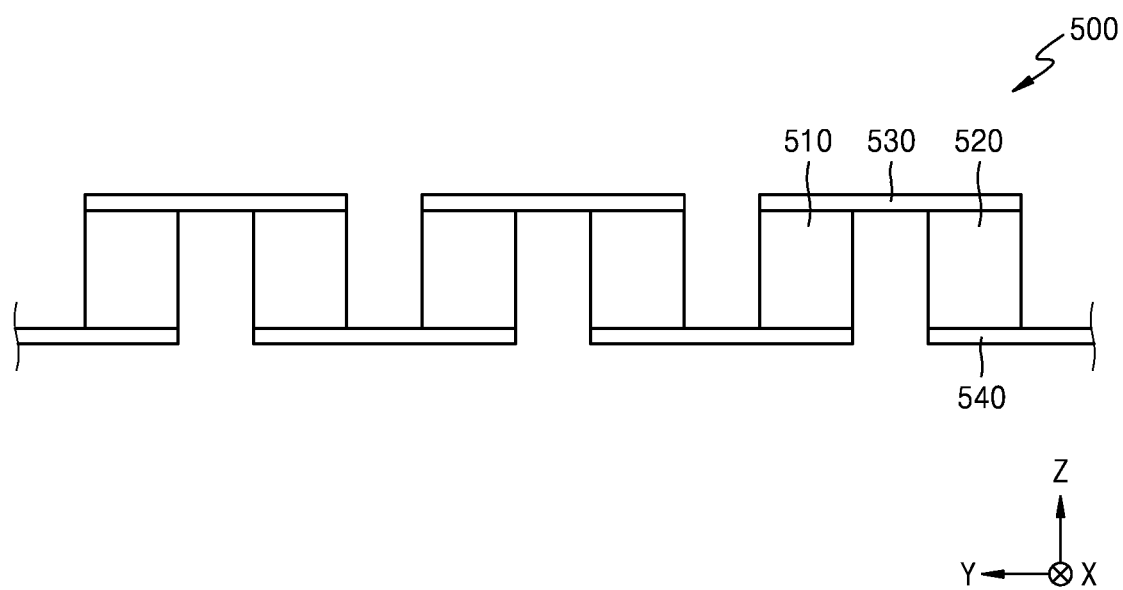
FIG. 6 is a cross-sectional view illustrating a thermoelectric layer corresponding to one pixel according to an example embodiment.

FIG. 6 is a cross-sectional view illustrating the thermoelectric layer 500 corresponding to one pixel according to an example embodiment. Referring to FIGS. 2 and 6, the thermoelectric layers 500 may include a plurality of n-type semiconductor layers 510 and p-type semiconductor layers 520 that are alternately arranged, and a third electrode 530 and a fourth electrode 540 in contact with the plurality of n-type semiconductor layers 510 and p-type semiconductor layers 520. For example, if the first pixel PX1 includes the n-type semiconductor layers 510, the second pixel PX2 includes the p-type semiconductor layers 520, and if the first pixel PX1 includes the p-type semiconductor layers 520, the second pixel PX2 includes the n-type semiconductor layers 510. The third electrode 530 may be disposed on upper portions of the plurality of n-type semiconductor layers 510 and p-type semiconductor layers 520, and the fourth electrode 540 may be disposed on lower portions of the plurality of n-type semiconductor layers 510 and p-type semiconductor layers 520. In addition, the third electrode 530 and the fourth electrode 540 may be alternately in contact with a pair of n-type semiconductor layer 510 and p-type semiconductor layer 520, and thus the n-type semiconductor layer 510 and the p-type semiconductor layer 520 of the thermoelectric layer 500 may be electrically connected to each other in series.

The plurality of n-type semiconductor layers 510 and p-type semiconductor layers 520 included in one pixel may be arranged one-dimensionally. However, the disclosure is not limited thereto. The plurality of n-type semiconductor layers 510 and p-type semiconductor layers 520 may be arranged two-dimensionally to form the thermoelectric layer 500.

Figure 7A:
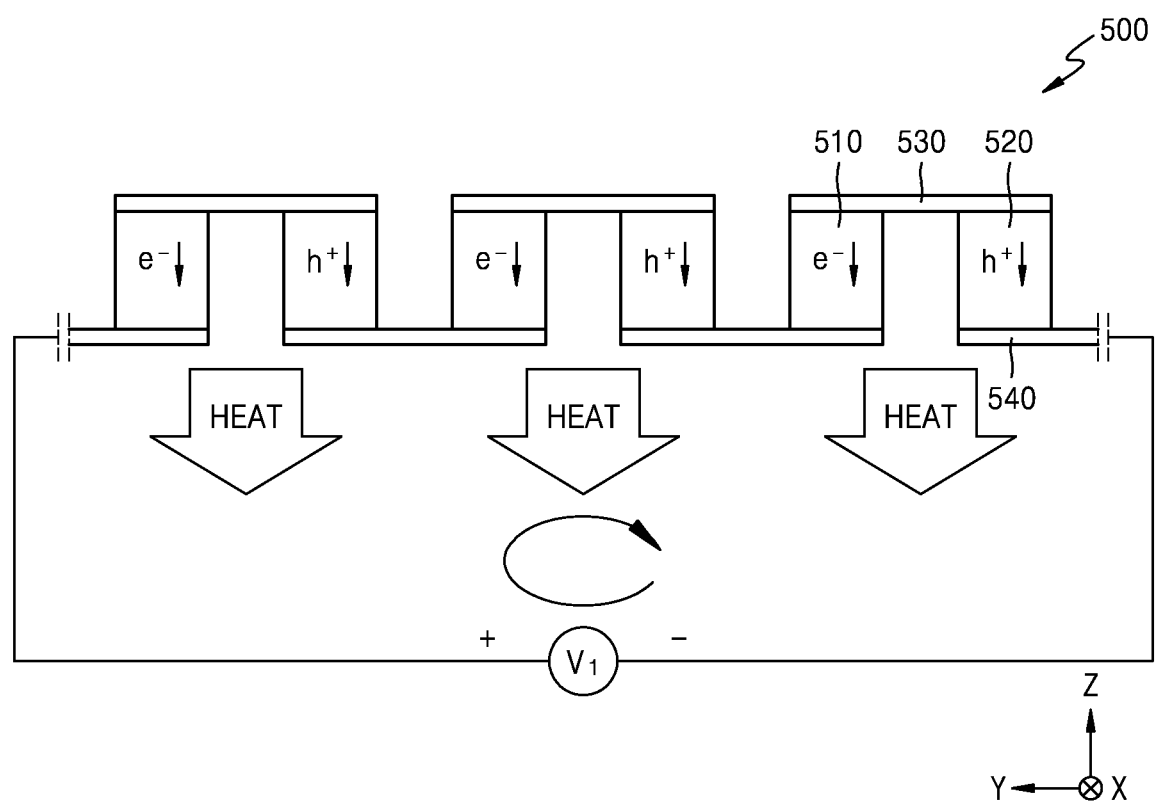
FIGS. 7A and 7B are reference views illustrating an operating principle of a thermoelectric layer according to an example embodiment.
Figure 7B:
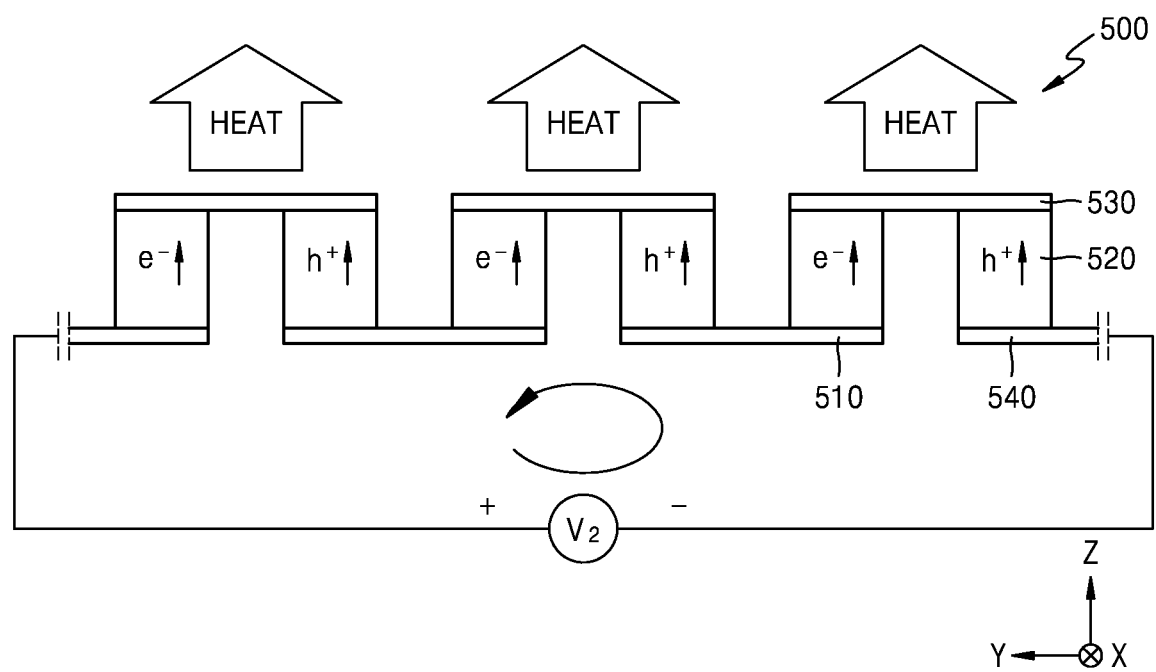

FIGS. 7A and 7B are reference views illustrating an operating principle of the thermoelectric layer 500 according to an example embodiment.

As shown in FIG. 7A, when an electrical signal is applied to the thermoelectric layer 500 so that current flows in a clockwise direction, electrons (e−) and holes (h+), which are carriers, may be generated in the third electrode 530, and thus electrons (e−) may flow through the n-type semiconductor layer 510 and holes (h+) may flow through the p-type semiconductor layer 520. In addition, these carriers may be recombined in the fourth electrode 540. Active cooling is performed on an electrode in which carriers are generated, that is, the third electrode 530, and a region adjacent thereto so that temperature may fall, and heat rejection is performed on an electrode to which carriers are recombined, that is, the fourth electrode 540, and a region adjacent thereto so that the temperature may rise.

The thermoelectric layer 500 of FIG. 7A may move heat from the second reflective layer 300 to the thermoelectric layer 500 to release the heat to the outside. Hereinafter, for convenience of description, an electrical signal applied to the thermoelectric layer 500 to move heat from the second reflective layer 300 to the thermoelectric layer 500 may be referred to as a negative Peltier signal.

As shown in FIG. 7B, when an electrical signal is applied to the thermoelectric layer 500 so that a current flows in a counterclockwise direction, electrons (e−) and holes (h+), which are carriers, may be generated in the fourth electrode 540, and thus electrons (e−) may flow through the n-type semiconductor layer 510 and holes (h+) may flow through the p-type semiconductor layer 520. In addition, these carriers may be recombined in the third electrode 530. Active cooling is performed on an electrode in which carriers are generated, that is, the fourth electrode 540, and a region adjacent thereto so that temperature may fall, and heat rejection is performed on an electrode to which carriers are recombined, that is, the third electrode 530, and a region adjacent thereto so that the temperature may rise.

The thermoelectric layer 500 of FIG. 7B moves heat from the thermoelectric layer 500 to the second reflective layer 300. Hereinafter, for convenience of description, an electrical signal applied to the thermoelectric layer 500 to move heat from the thermoelectric layer 500 to the second reflective layer 300 may be referred to as a positive Peltier signal.

The processor 20 according to an example embodiment may control the thermoelectric layer 500 in conjunction with an electrical signal provided to a pixel corresponding to the thermoelectric layer 500.

In an example embodiment, when applying an off signal to grating structures GGS1 of a first group, the processor 20 may apply an electrical signal, that is, a negative Peltier signal, for moving heat from the grating structures GGS1 of the first group to the first thermoelectric layer 501. The first thermoelectric layer 501 may remove heat remaining in the grating structures GGS1 of the first group, and may remove the moved heat from grating structures of another adjacent group, for example, grating structures GGS2 of a second group.

The processor 20 may simultaneously apply an off signal and a negative Peltier signal to the grating structures GGS1 of first group and the first thermoelectric layer 501. Alternatively, the processor 20 may apply a negative Peltier signal to the first thermoelectric layer 501 after applying the off signal to the grating structures GGS1 of the first group.

In an example embodiment, when applying an on signal to the grating structures GGS1 of the first group, the processor 20 may apply an electrical signal, that is, a positive Peltier signal, to the first thermoelectric layer 501 for moving heat from the first thermoelectric layer 501 to the grating structures GGS1 of the first group. Thus, not only the heat generated in the grating structures GGS1 of the first group may be prevented from moving to the grating structures GGS1 of another group or outside, but also heat may be additionally provided to the grating structures GGS1 of the first group, thereby facilitating a refractive index change of the grating structures GGS1 of the first group.

The processor 20 may simultaneously apply the on signal and the positive Peltier signal to the grating structures GGS1 of the first group and the first thermoelectric layer 501. Alternatively, the processor 20 may apply the positive Peltier signal to the first thermoelectric layer 501 after applying the on signal to the grating structures GGS1 of the first group.

In another example embodiment, the processor 20 may not apply an electrical signal to the first thermoelectric layer 501 when applying the on signal to the grating structures GGS1 of the first group. The refractive index change of the grating structures GGS1 of the first group is determined solely by the on signal applied to the grating structures GGS1 of the first group, and thus accuracy of pixel control may be improved.

Figure 8:
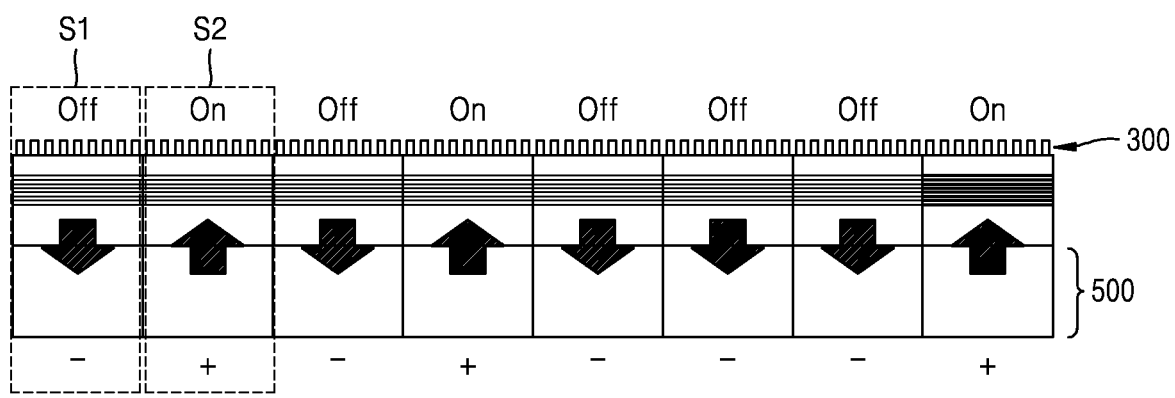
FIG. 8 is a reference diagram illustrating an interaction relationship between an electrical signal applied to a second reflective layer and an electrical signal applied to a thermoelectric layer, according to an example embodiment.

FIG. 8 is a reference diagram illustrating an interaction relationship between an electrical signal applied to the second reflective layer 300 and an electrical signal applied to the thermoelectric layer 500 according to an example embodiment.

The processor 20 according to an example embodiment may apply an electrical signal corresponding to a phase profile for a specific steering angle to the second reflective layer 300. The above phase profile may be a binary electrical signal. For example, the processor 20 may apply an on signal or an off signal for each pixel.

The processor 20 according to an example embodiment may apply a negative Peltier signal or a positive Peltier signal to the thermoelectric layer 500 corresponding to a pixel. The processor 20 may apply a negative Peltier signal to the thermoelectric layer 500 corresponding to a pixel to which the off signal is applied (S1), and may apply a positive Peltier signal to the thermoelectric layer 500 corresponding to a pixel to which the on signal is applied (S2).

In the pixel to which the on signal is applied, heat is increased by the positive Peltier signal, and in the pixel to which the off signal is applied, heat is decreased by the negative Peltier signal, and thus a side mode suppression ratio (SMSR) of the spatial light modulator 10 may be improved.

Figure 9:
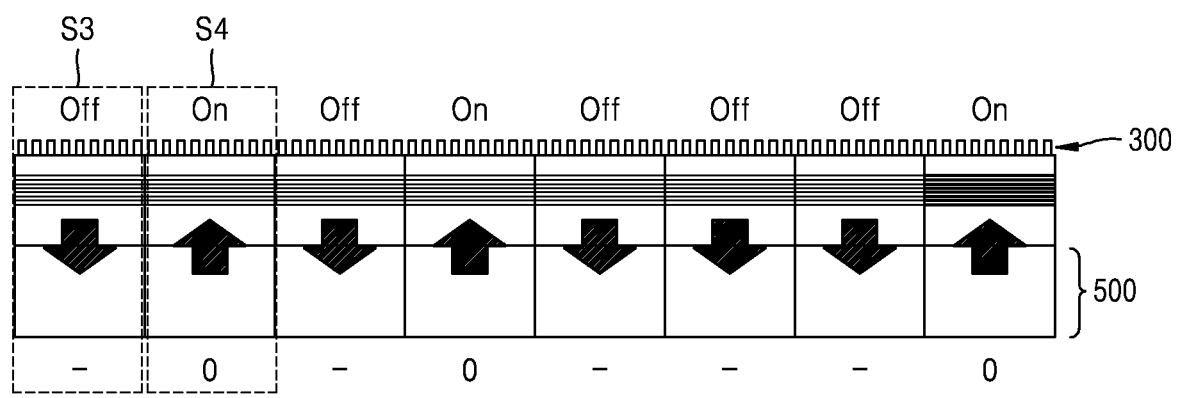
FIG. 9 is a reference diagram illustrating an interaction relationship between an electrical signal applied to a second reflective layer and an electrical signal applied to a thermoelectric layer, according to another example embodiment.

FIG. 9 is a reference diagram illustrating an interaction relationship between an electrical signal applied to the second reflective layer 300 and an electrical signal applied to the thermoelectric layer 500 according to another example embodiment.

The processor 20 according to an example embodiment may apply an electrical signal corresponding to a phase profile for a specific steering angle to the second reflective layer 300. The above phase profile may be a binary electrical signal. For example, the processor 20 may apply an on signal or an off signal for each pixel.

The processor 20 according to an example embodiment may apply a negative Peltier signal or a zero Peltier signal to the thermoelectric layer 500 corresponding to a pixel. Here, the zero Peltier signal may mean that no electrical signal is applied to the thermoelectric layer 500. The processor 20 may apply a negative Peltier signal to the thermoelectric layer 500 corresponding to a pixel to which the off signal is applied (S3), and may apply a zero Peltier signal to the thermoelectric layer 500 corresponding to a pixel to which the on signal is applied (S4).

The zero Peltier is applied to the thermoelectric layer 500 corresponding to the pixel to which the on signal is applied, and thus a refractive index change of the pixel may be determined solely by the electrical signal applied to the pixel.

Figure 10:
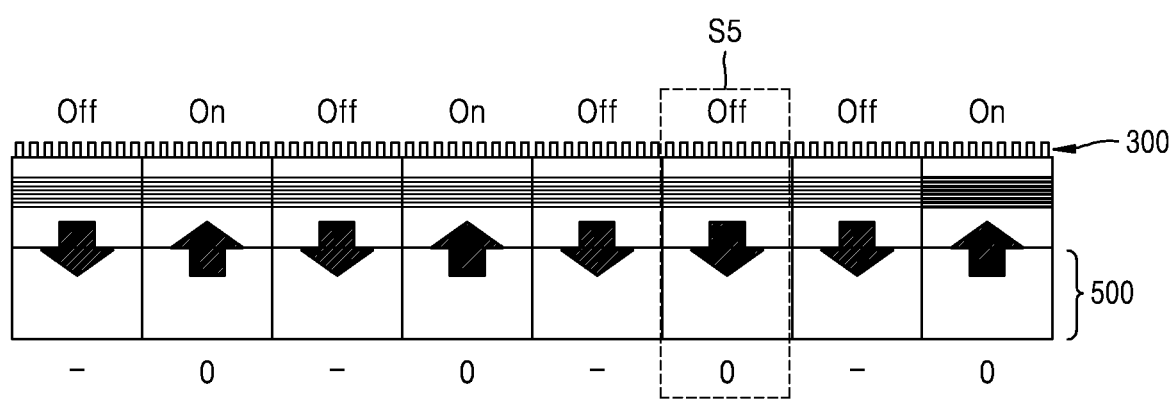
FIG. 10 is a reference diagram illustrating an interaction relationship between an electrical signal applied to a second reflective layer and an electrical signal applied to a thermoelectric layer, according to another example embodiment.

FIG. 10 is a reference diagram illustrating an interaction relationship between an electrical signal applied to the second reflective layer 300 and an electrical signal applied to the thermoelectric layer 500 according to another example embodiment.

Upon comparing FIGS. 9 and 10, when a negative Peltier signal is applied to a neighboring thermoelectric layer 500 among the thermoelectric layers 500 corresponding to a pixel to which an off signal is applied, a zero Peltier signal may be applied to the thermoelectric layer 500 (S5). The negative Peltier signal is already applied to the neighboring thermoelectric layer 500, and thus heat is less likely to flow in from neighboring pixels. Accordingly, power efficiency of the spatial light modulator 10 may be increased by not applying an electrical signal to the thermoelectric layer 500.

The processor 20 according to an example embodiment may apply a negative Peltier signal to the entire thermoelectric layers 500.

Figure 11:
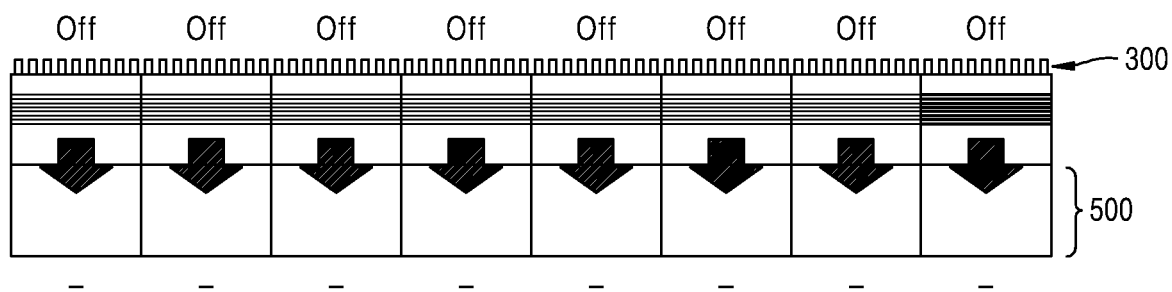
FIG. 11 is a reference diagram illustrating a case in which a negative Peltier signal is applied, according to an example embodiment.

FIG. 11 is a reference diagram illustrating a case in which a negative Peltier signal is applied according to an example embodiment. Whenever the spatial light modulator 10 is in a standby state before modulating light or a phase profile is changed, the processor 20 may apply the negative Peltier signal to the entire thermoelectric layers 500. The thermoelectric layer 500 may radiate heat inside the spatial light modulator 10 to the outside. Thus, the refractive index of the first reflective layer 100 may also be initialized. This may more accurately control the spatial light modulator 10 by removing heat remaining due to the operation of the spatial light modulator 10.

Figure 12:
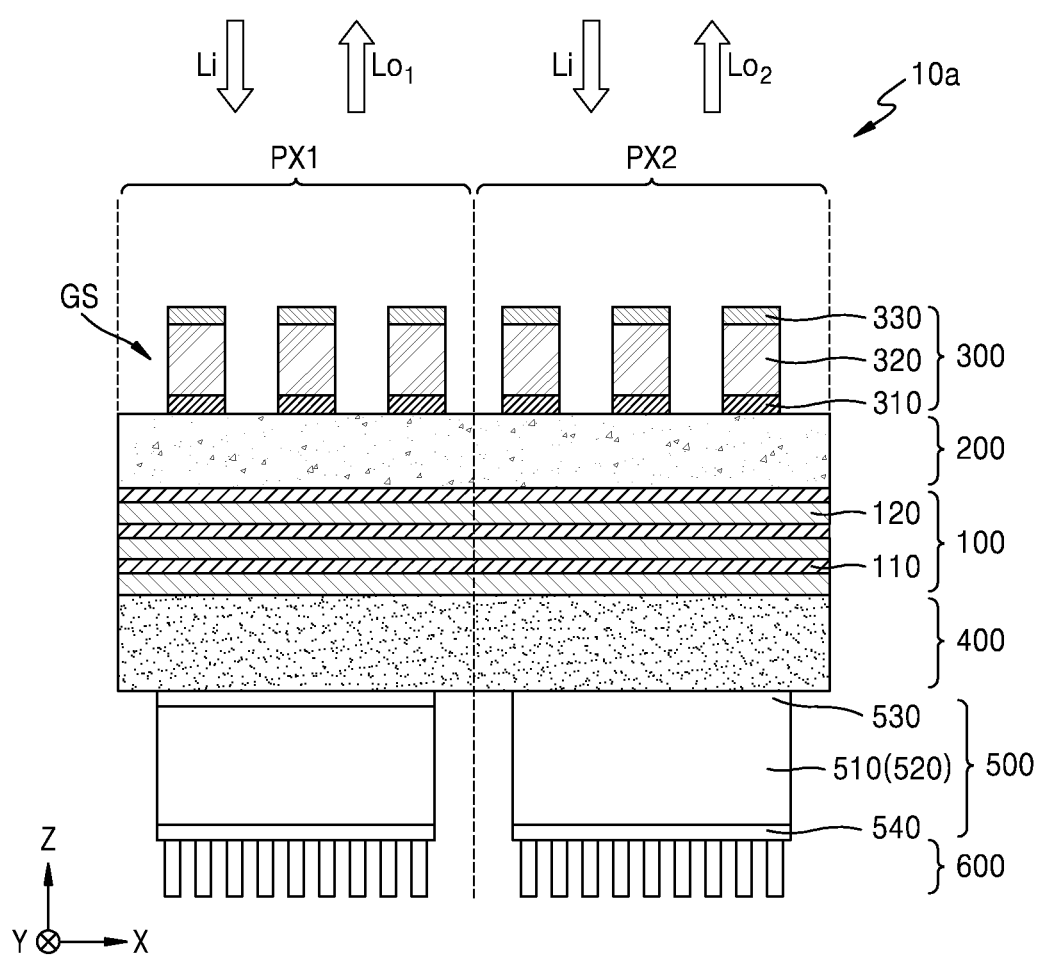
FIG. 12 is a diagram illustrating a spatial light modulator including a heat dissipation member according to an example embodiment.

FIG. 12 is a diagram illustrating a spatial light modulator 10a including a heat dissipation member 600 according to an example embodiment. Upon comparing FIGS. 2 and 12, the spatial light modulator 10a of FIG. 12 may further include the heat dissipation member 600 under the thermoelectric layer 500. The heat dissipation member 600 may be a fin type. The heat dissipation member 600 may induce heat to be discharged to the outside by increasing a surface region in contact with the outside.

The heat dissipation member 600 may be formed of a metal having excellent thermal conductivity, such as aluminum (Al) or copper (Cu), and may also be formed of a resin material having excellent thermal conductivity in addition to the metal. The heat dissipation member 600 may be formed integrally with the fourth electrode 540 of the thermoelectric layer 500.

Figure 13:
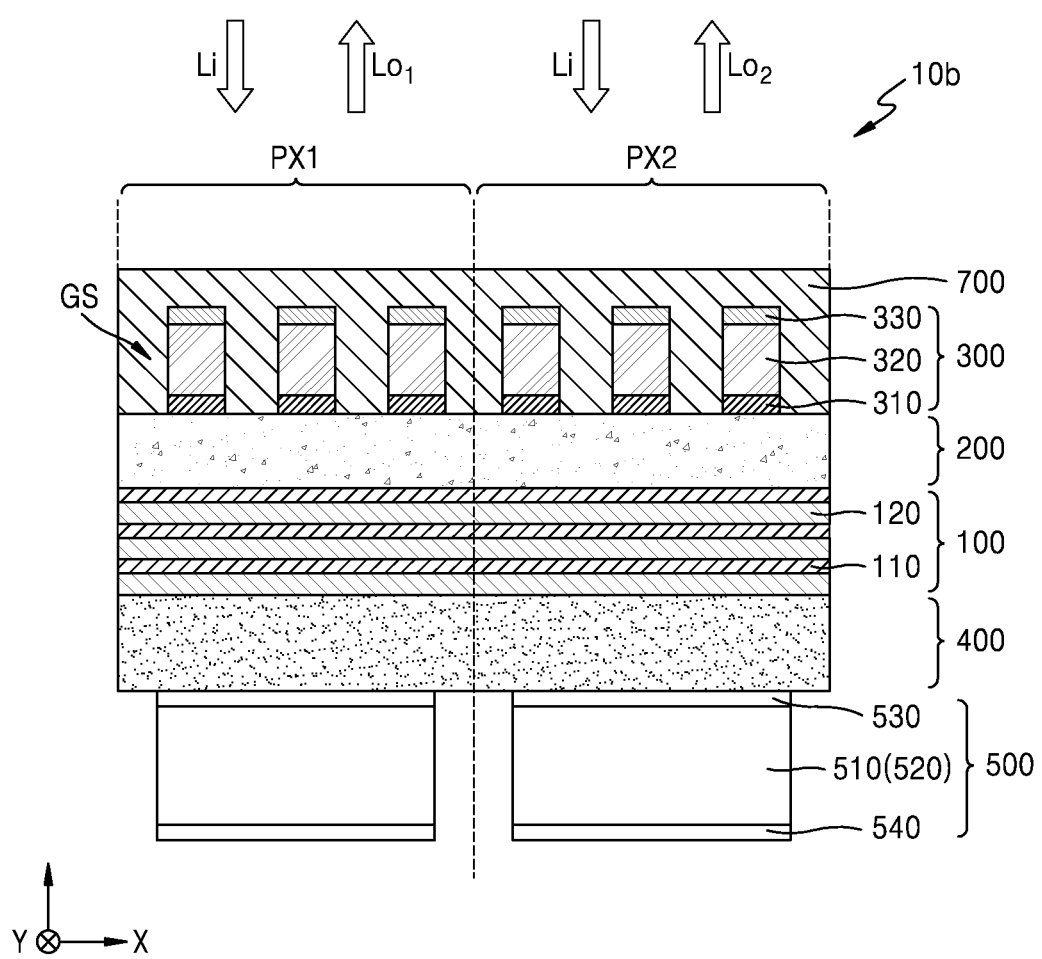
FIG. 13 is a diagram illustrating a spatial light modulator further including a dielectric layer according to an example embodiment.

FIG. 13 is a diagram illustrating a spatial light modulator 10b further including a dielectric layer 700 according to an example embodiment. Upon comparing FIGS. 2 and 13, the spatial light modulator 10 of FIG. 13 may further include the dielectric layer 700 covering the second reflective layer 300. The dielectric layer 700 may be filled between the grating structures GS. The dielectric layer 700 may include a material having a refractive index smaller than that of the grating structures GS, for example, at least one of silicon oxide and silicon nitride. The dielectric layer 700 may protect the grating structures GS.

Figure 14:
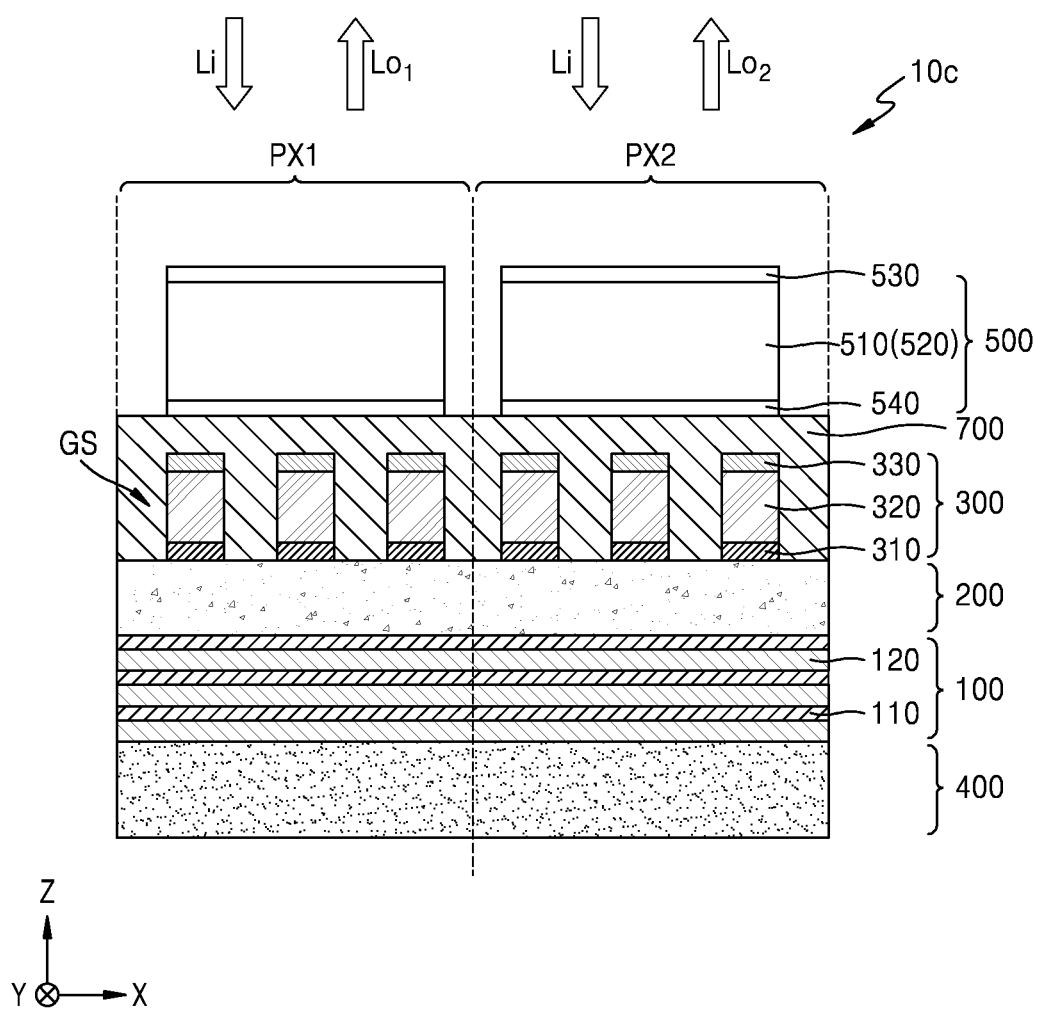
FIG. 14 is a diagram illustrating a spatial light modulator according to another example embodiment.

FIG. 14 is a diagram illustrating a spatial light modulator 10c according to another example embodiment. Upon comparing FIGS. 13 and 14, the thermoelectric layer 500 may be disposed on an upper portion of the dielectric layer 700. The thermoelectric layer 500 is disposed closer to the grating structures GS, thereby more effectively controlling a heat transfer with the grating structures GS.

Figure 15:
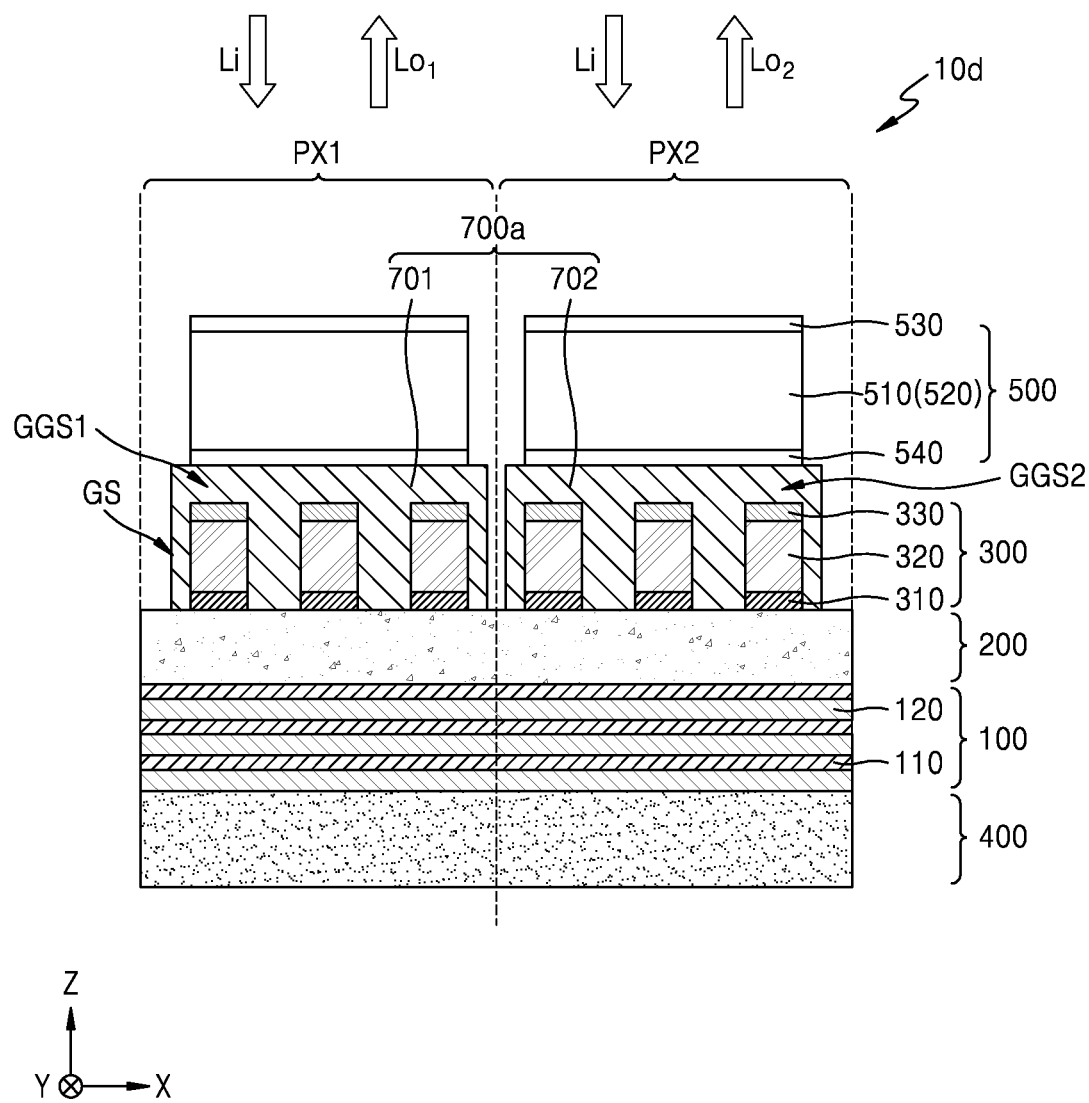
FIG. 15 is a diagram illustrating a spatial light modulator according to another example embodiment.

FIG. 15 is a diagram illustrating a spatial light modulator 10d according to another example embodiment. Referring to FIG. 15, the grating structures GS may be grouped in units of pixels, and the grouped grating structures GS may be surrounded by a dielectric layer 700a. The dielectric layer 700a may include a first dielectric layer 701 covering the grating structures GGS1 of the first group and a second dielectric layer 702 covering the grating structures GS of second group. Also, the first dielectric layer 701 and the second dielectric layer 702 may be spaced apart from each other. The same electrical signal is applied to the grating structures GS in units of pixels, and thus a heat distribution may be the same in the grating structures GS within the same pixel by the dielectric layer 700a.

The spatial light modulators 10, 10a, 10b, 10c, and 10d described above may be applied to, for example, beam steering devices such as depth sensors used in three-dimensional cameras or three-dimensional sensors such as LiDAR apparatuses, to increase precision. LiDAR apparatuses may be applied to mobile devices such as autonomous vehicles, drones, etc., small walking means, for example, bicycles, motorcycles, strollers, boards, etc., robots, auxiliary means for people/animals, for example, sticks, helmets, accessories, clothing, watches, bags, etc., Internet of Things (IoT) devices/systems, security devices/systems, etc.

Furthermore, the spatial light modulators 10, 10a, 10b, 10c, and 10d may be applied to various systems other than LiDAR apparatuses. For example, as three-dimensional information of space and an object may be acquired through scanning by using the spatial light modulators 10, 10a, 10b, 10c, and 10d, the spatial light modulators 10, 10a, 10b, 10c, and 10d may be applied to a three-dimensional image acquisition device, a three-dimensional camera, etc. Furthermore, the spatial light modulators 10, 10a, 10b, 10c, and 10d may be applied to a holographic display device and a structured light generation device. Furthermore, the spatial light modulators 10, 10a, 10b, 10c, and 10d may be applied to various optical devices such as hologram generators, optical coupling devices, variable focus lenses, depth sensors, etc. Furthermore, the spatial light modulators 10, 10a, 10b, 10c, and 10d may be applied to various fields in which a meta surface or a meta structure is used. In addition, the spatial light modulators 10, 10a, 10b, 10c, and 10d according to embodiments of the disclosure, and a LiDAR apparatus including the same, may be applied to various fields of optical and electronic devices for various uses.

Figure 16:
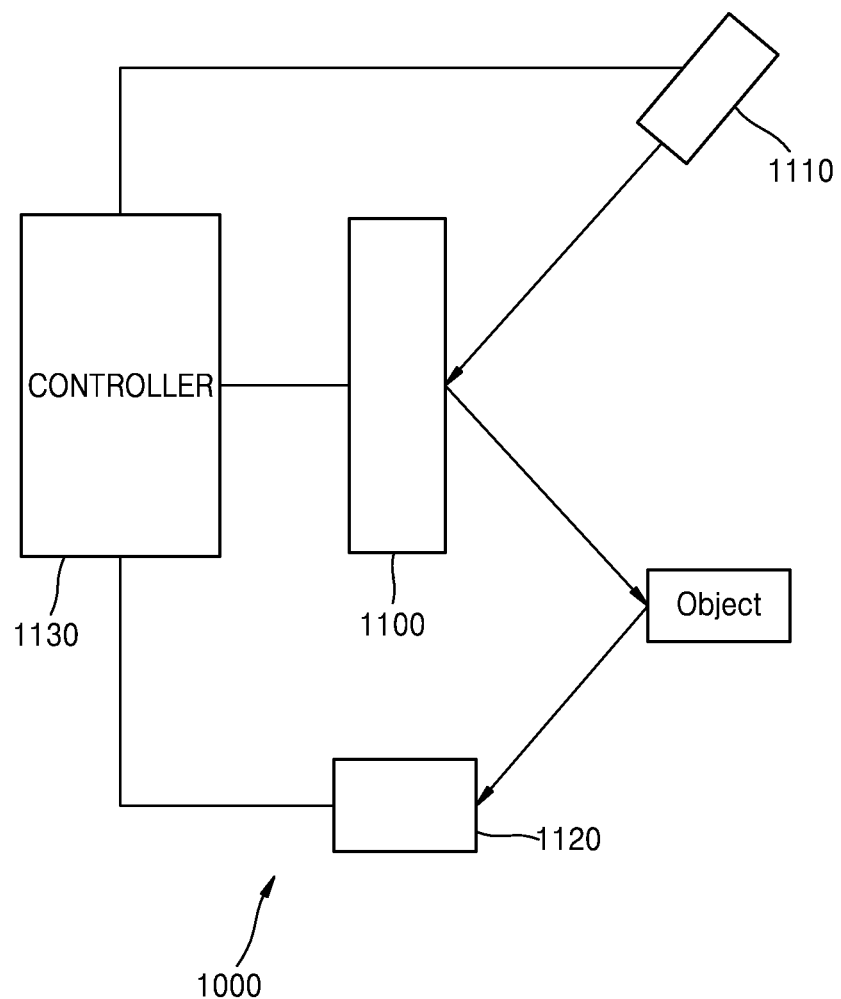
FIG. 16 is a schematic block diagram showing the structure of a light detection and ranging (LiDAR) apparatus according to an example embodiment.

FIG. 16 is a schematic block diagram showing the structure of a LiDAR apparatus 1000 according to an example embodiment.

Referring to FIG. 11, the LiDAR apparatus 1000 according to an example embodiment may include a light source 1110 for emitting light, a spatial light modulator 1100 for controlling a travel direction of incident light from the light source 1110, a photodetector 1120 for detecting light emitted from the spatial light modulator 1100 and reflected from an object, and a controller (e.g., a processor) 1130 for controlling the spatial light modulator 1100.

The light source 1110 may include, for example, a light source for emitting visible light or a laser diode (LD) or light-emitting diode (LED) for emitting a near infrared ray of about 800 nm to about 1700 nm band.

The spatial light modulator 1100 may include the spatial light modulators 10, 10a, 10b, 10c, and 10d described above. The spatial light modulator 1100 may control the travel direction of light by modulating the phase of light for each pixel.

The controller 1130 may control the operations of the spatial light modulator 1100, the light source 1110, and the photodetector 1120. For example, the controller 1130 may control the on/off operation of the light source 1110 and the photodetector 1120, and the beam scanning operation of the spatial light modulator 1100. Furthermore, the controller 1130 may calculate information about the object on the basis of a measurement result of the photodetector 1120.

The LiDAR apparatus 1000 may periodically emit light with respect to many regions therearound, by using the spatial light modulator 1100, to acquire information about objects therearound at a plurality of locations.

Figure 17:
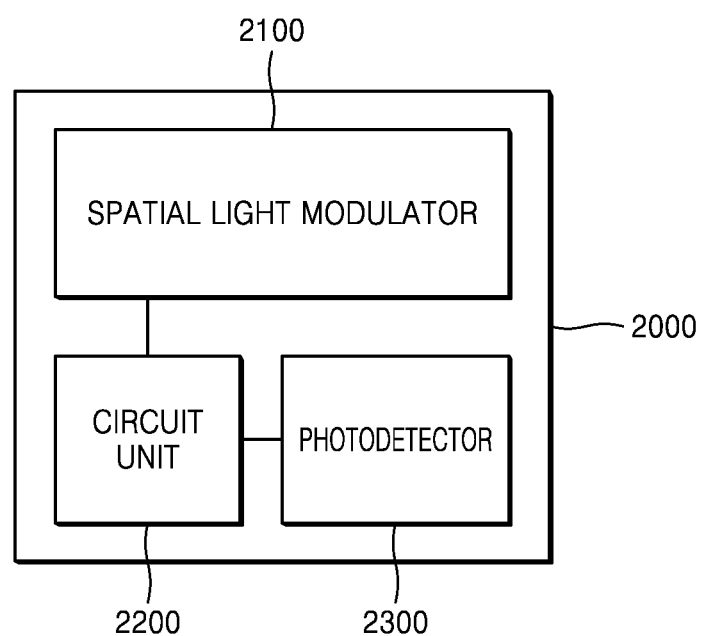
FIG. 17 is a schematic block diagram showing the structure of a LiDAR apparatus according to another example embodiment.

FIG. 17 is a schematic block diagram showing the structure of a LiDAR apparatus 2000 according to another example embodiment.

Referring to FIG. 17, The LiDAR apparatus 2000 may include a spatial light modulator 2100 and a photodetector 2300 for detecting light that has a travel direction controlled by the spatial light modulator 2100 and is reflected by an object. The LiDAR apparatus 2000 may further include a circuit unit 2200 connected to the spatial light modulator 2100 and/or the photodetector 2300. The circuit unit 2200 may include an operating unit for acquiring and operating data, a driving unit, a controller, a processor, etc. Furthermore, the circuit unit 2200 may further include a power unit, a memory, etc.

The LiDAR apparatus 2000 of FIG. 17 is illustrated as including the spatial light modulator 2100 and the photodetector 2300 in one device, the spatial light modulator 2100 and the photodetector 2300 may be separately provided in separate devices, not provided in one device. Furthermore, the circuit unit 2200 may be connected to the spatial light modulator 2100 or the photodetector 2300, not in a wired manner, but in a wireless communication manner.

The above-described LiDAR apparatuses may be a phase-shift type apparatus or a time-of-flight (TOF) type apparatus.

Figure 18A:
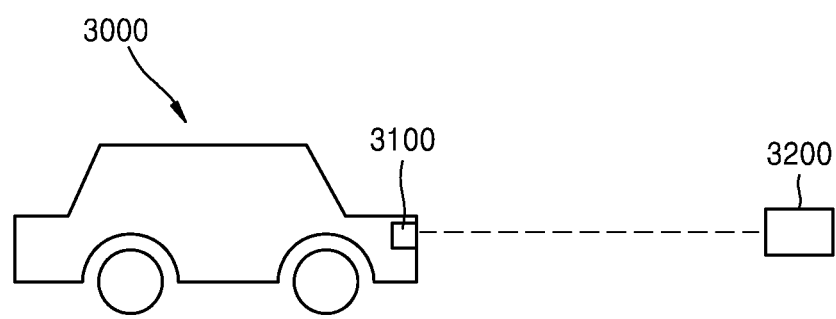
FIGS. 18A and 18B are conceptual views showing a case in which a LiDAR apparatus is applied to a vehicle.
Figure 18B:
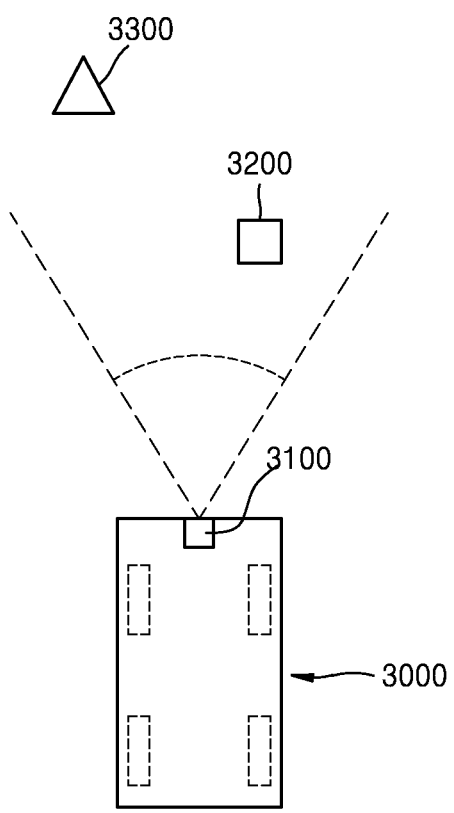

FIGS. 18A and 18B are conceptual views showing a case in which a LiDAR apparatus 3100 is applied to a vehicle 3000. FIG. 18A is a view when viewed from the side of the vehicle, and FIG. 18B is a view when viewed from the above.

Referring to FIG. 18A, the LiDAR apparatus 3100 may be applied to the vehicle 3000, and information about an object 3200 may be acquired by using the LiDAR apparatus 3100. The vehicle 3000 may be a vehicle having an autonomous function. An object or a human, that is, the object 3200, located in a direction in which the vehicle 3000 drives may be detected by suing the LiDAR apparatus 3100. Furthermore, a distance to the object 3200 may be measured by using information such as a time difference between a transmitting signal and a detection signal. Furthermore, as illustrated in FIG. 18B, information about the object 3200 located nearby and an object 3300 located remotely, which are within a scan range, may be acquired.

As the heat transfer between the grating structures or pixels included in the spatial light modulator and the electronic apparatus according to an example embodiment is reduced, a light phase modulation efficiency may be improved.

While not restricted thereto, an example embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an example embodiment may be written as a computer program transmitted over a computer-readable transmission medium, such as a carrier wave, and received and implemented in general-use or special-purpose digital computers that execute the programs. Moreover, it is understood that in example embodiments, one or more units of the above-described apparatuses and devices can include circuitry, a processor, a microprocessor, etc., and may execute a computer program stored in a computer-readable medium.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A spatial light modulator comprising:
    a first reflective layer and a second reflective layer, the second reflective layer comprising grating structures of a first group and grating structures of a second group which are independently driven, and are immediately adjacent to each other;
    a cavity layer provided between the first reflective layer and the second reflective layer; and
    a thermoelectric layer configured to cause heat transfer to occur between the thermoelectric layer and the second reflective layer,
    wherein the thermoelectric layer comprises a first thermoelectric layer and a second thermoelectric layer to which different electrical signals are applied, wherein the first thermoelectric layer corresponds to the grating structures of the first group, and the second thermoelectric layer corresponds to the grating structures of the second group.

2. The spatial light modulator of claim 1, wherein the first reflective layer and the cavity layer are provided between the second reflective layer and the thermoelectric layer.

3. The spatial light modulator of claim 1, wherein the grating structures of the first group are disposed directly above the first thermoelectric layer in a thickness direction of the spatial light modulator, and the grating structures of the second group are disposed directly above the second thermoelectric layer in the thickness direction of the spatial light modulator.

4. The spatial light modulator of claim 1, wherein, when an off signal is applied to the grating structures of the first group, a first electrical signal that causes heat transfer from the grating structures of the first group to the first thermoelectric layer, is applied to the first thermoelectric layer.

5. The spatial light modulator of claim 4, wherein, when an on signal is applied to the grating structures of the first group, a second electrical signal that causes heat transfer from the first thermoelectric layer to the grating structures of the first group, is applied to the first thermoelectric layer.

6. The spatial light modulator of claim 5, wherein polarities of the first electrical signal and the second electrical signal are different from each other.

7. The spatial light modulator of claim 1, wherein, when an on signal is applied to the grating structures of the first group, an electrical signal is not applied to the first thermoelectric layer.

8. The spatial light modulator of claim 1, wherein, when an on signal is applied to the grating structures of the first group and an off signal is applied to the grating structures of the second group, a third electrical signal that causes heat transfer from the grating structures of the second group to the second thermoelectric layer, is applied to the second thermoelectric layer.

9. The spatial light modulator of claim 8, wherein no electrical signal is applied to the first thermoelectric layer.

10. The spatial light modulator of claim 8, wherein a fourth electrical signal having a polarity different from that of the third electrical signal is applied to the first thermoelectric layer.

11. The spatial light modulator of claim 8, wherein the second reflective layer further comprises grating structures of a third group, that is immediately adjacent to the grating structures of the second group and spaced apart from the grating structures of the first group,
    wherein the thermoelectric layer further comprises a third thermoelectric layer corresponding to the grating structures of the second group, and
    when the off signal is applied to the grating structures of the third group, a fourth electrical signal having the same polarity as that of the third electrical signal is applied to the third thermoelectric layer, or an electrical signal is not applied to the third thermoelectric layer.

12. The spatial light modulator of claim 1, wherein before a driving signal is applied to the spatial light modulator, a signal that causes heat transfer from the second reflective layer to the thermoelectric layer is applied to the entire thermoelectric layer.

13. The spatial light modulator of claim 1, wherein the thermoelectric layer causes heat transfer to occur by a Peltier effect.

14. The spatial light modulator of claim 1, wherein the thermoelectric layer further comprises:
    a plurality of n-type semiconductor layers and a plurality of p-type semiconductor layers alternately arranged; and
    an electrode configured to electrically connect the plurality of n-type semiconductor layers and the plurality of p-type semiconductor layers, in series.

15. The spatial light modulator of claim 1, further comprising an insulating layer provided between the first reflective layer and the thermoelectric layer.

16. The spatial light modulator of claim 1, wherein at least one of the grating structures comprises any one of a PIN structure, a NIN structure, and a PIP structure.

17. The spatial light modulator of claim 1, wherein pitches of the grating structures are less than a wavelength of light modulated by the spatial light modulator.

18. The spatial light modulator of claim 1, wherein the first reflective layer is a distributed Bragg reflective layer.

19. An electronic apparatus comprising:
a spatial light modulator comprising a plurality of pixels configured to steer incident light, and a plurality of thermoelectric layers configure to control heat transfer between the plurality of pixels according to a control signal; and
a processor configured to provide the control signal that controls transfer of heat generated in the plurality of pixels to the plurality of thermoelectric layers while providing a driving signal that steers the incident light to the plurality of pixels,
wherein the plurality of pixels comprises:
a first reflective layer and a second reflective layer; and
a cavity layer provided between the first reflective layer and the second reflective layer, wherein the second reflective layer comprises grating structures of a first group and grating structures of a second group, which are independently driven and are immediately adjacent to each other, and
wherein the plurality of thermoelectric layers comprise a first thermoelectric layer and a second thermoelectric layer, to which different electrical signals are applied, the first thermoelectric layer corresponding to the grating structures of the first group and the second thermoelectric layer corresponding to the grating structures of the second group.

20. The electronic apparatus of claim 19, wherein the processor is further configured to, when applying an on signal to the grating structures of the first group and an off signal to the grating structures of the second group, apply, to the second thermoelectric layer, a third electrical signal that causes heat transfer from the grating structures of the second group to the second thermoelectric layer.

21. The electronic apparatus of claim 20, wherein the processor is further configured to apply no electrical signal to the first thermoelectric layer.

22. The electronic apparatus of claim 20, wherein the processor is further configured to apply, to the first thermoelectric layer, an electrical signal for heat transfer from the first thermoelectric layer in a direction of the grating structures of the first group.

23. An electronic device for detecting an object, the electronic device comprising:
a spatial light modulator comprising a plurality of pixels; and
a processor configured to:
generate a control signal based on a pre-stored phase profile, to cause the spatial light modulator to release heat according to the control signal; and
detect the object based on an optical signal that is modulated by the spatial light modulator,
wherein the plurality of pixels comprises a plurality of groups of grating structures and a plurality of thermoelectric layers, respectively, and
wherein the plurality of thermoelectric layers are spaced apart from each other and are aligned with the plurality of groups of grating structures in a light incident direction of the spatial light modulator, respectively, and comprise n-type semiconductor layers and p-type semiconductor layers that are alternately arranged, in a direction perpendicular to the light incident direction of the spatial light modulator,
wherein the plurality of groups of grating structures comprises a first group of grating structures and a second group of grating structures, which are independently driven and are immediately adjacent to each other, and
wherein the plurality of thermoelectric layers comprise a first thermoelectric layer and a second thermoelectric layer to which different electrical signals are applied, wherein the first thermoelectric layer corresponds to the first group of grating structures, and the second thermoelectric layer corresponds to the second group of grating structures.

* * * * *